US005759213A

United States Patent [19]

Adair et al.

[11] Patent Number: 5,759,213

[45] Date of Patent: Jun. 2, 1998

[54] METHOD FOR CONTROLLING THE SIZE AND MORPHOLOGY OF ALPHA-ALUMINA PARTICLES

[75] Inventors: James Hansell Adair; Sridhar Venigalla; Seung-Beom Cho, all of Gainesville, Fla.

[73] Assignee: University of Florida, Gainesville, Fla.

[21] Appl. No.: 775,380

[22] Filed: Dec. 30, 1996

Related U.S. Application Data

[63] Continuation of Ser. No. 427,132, Apr. 24, 1995, abandoned.

[51] Int. Cl.$^{6}$ .................................. C01F 7/02; C01F 7/34

[52] U.S. Cl. .......................... 23/305 A; 423/625; 423/626

[58] Field of Search .......................... 23/305 A; 423/625, 423/626

[56] References Cited

U.S. PATENT DOCUMENTS

| | | | |
|---|---|---|---|
| 4,629,618 | 12/1986 | Oguri et al. | 423/625 |
| 4,900,537 | 2/1990 | Wilhelmy | 423/629 |
| 5,194,243 | 3/1993 | Pearson et al. | 23/305 A |
| 5,401,703 | 3/1995 | Fukuda | 423/629 |

FOREIGN PATENT DOCUMENTS

| | | | |
|---|---|---|---|
| 391447 | 10/1990 | European Pat. Off. | 423/625 |
| 6-263437 | 9/1994 | Japan | 423/625 |

OTHER PUBLICATIONS

Perky, John P. Editor, Chemical Engineers Handbook Third Edition, McGraw-Hill Book Co Inc NY NY 1950 pp. 1054-1061.

*Primary Examiner*—Gary P. Straub
*Attorney, Agent, or Firm*—Thomas C. Saitta

[57] ABSTRACT

A method for producing phase-pure, monodispersed, single crystal alpha-alumina particles of controlled size and shape comprises the steps of providing an aluminum hydrous oxide precursor and a glycol solution, dispersing said precursor in said glycol solution to create a suspension, heating and stirring said suspension in a closed pressure vessel to produce alpha-alumina particles, cooling said suspension, and removing said alpha-alumina particles from said solution. Additionally nucleation seeds may be added to the solution. Control of size is a function of seeding concentration, and control of morphology is a function of stirring rate.

10 Claims, 4 Drawing Sheets

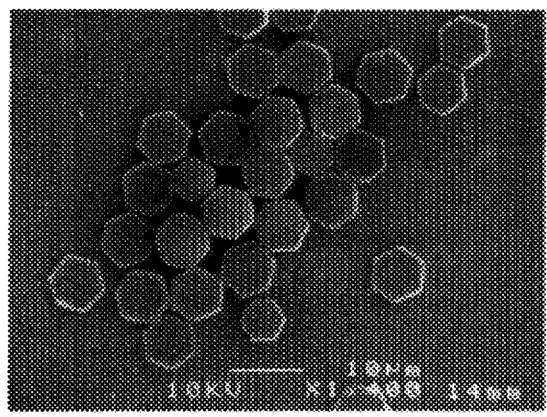
FIGURE 11
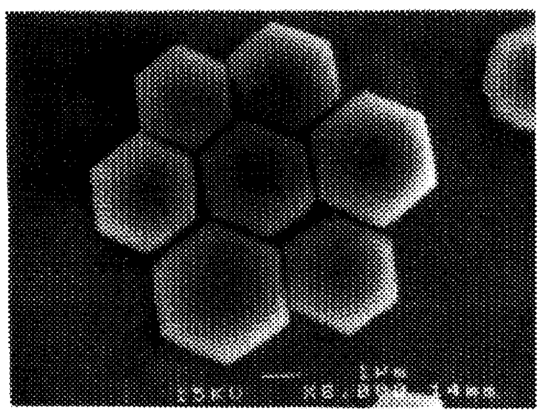
FIGURE 12
FIGURE 13
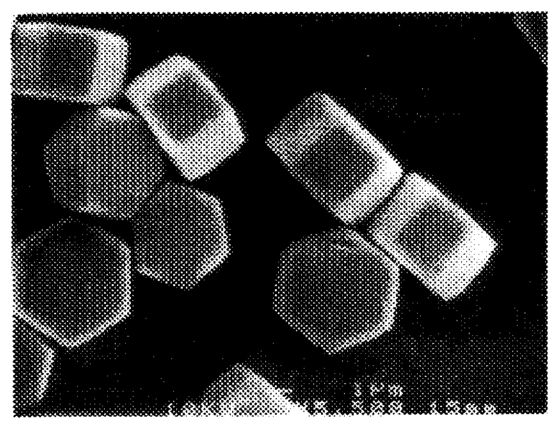
FIGURE 14

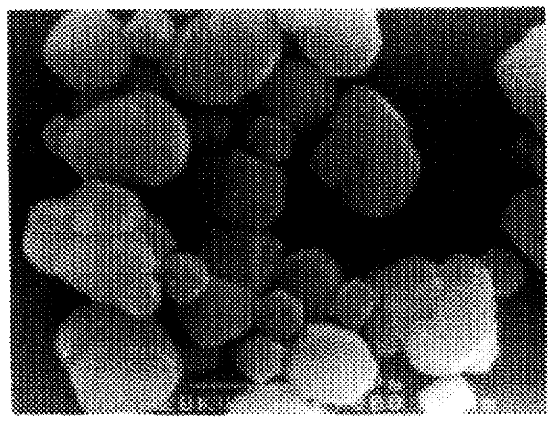
FIGURE 15
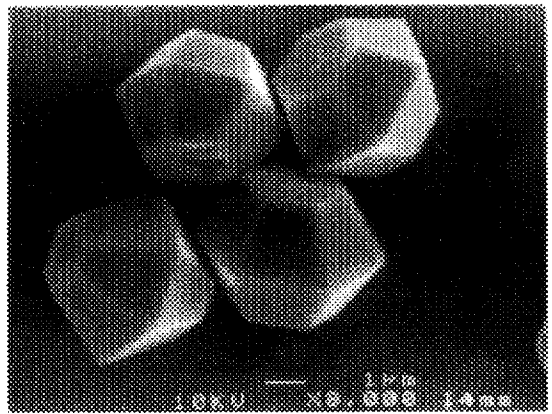
FIGURE 16
FIGURE 17
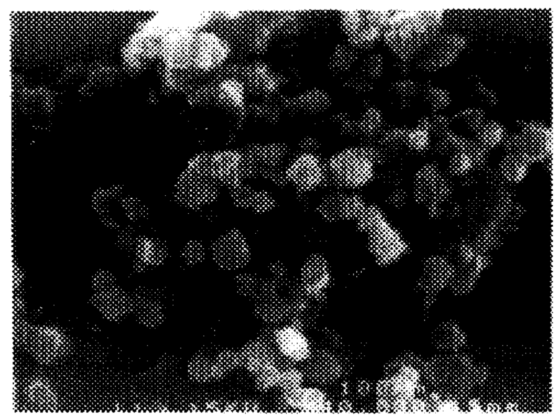
FIGURE 18

METHOD FOR CONTROLLING THE SIZE AND MORPHOLOGY OF ALPHA-ALUMINA PARTICLES

This application is a continuation of application Ser. No. 08/427,132, filed Apr. 24, 1995, now abandoned.

BACKGROUND OF THE INVENTION

This invention relates generally to methods for the synthesis of alpha-alumina particles. More particularly, the invention relates to methods for synthesizing alpha-alumina particles in solution, and in particular in 1,4-butanediol. Even more particularly, the invention relates to a method for controlling the size and the morphology of the particles.

Control of median size, size distribution and shape of precursor powders is very important in improving the performance of ceramics in electronic, optical and structural applications. Alpha-alumina (alpha-$Al_2O_3$) is one of the most widely used technical ceramics in these applications. Its mechanical, electrical and optical properties promote a wide range of applications such as microelectronics, catalysis, lasers, optics and refractories. There has been increasing interest in the synthesis of monodispersed, anisotropic single crystal particles as well. Conventional methods for producing alpha-alumina particles involve solid-state, thermally driven transformations in which the alpha-alumina phase is formed by the dehydration and phase transformations from the, hydrates of aluminum oxides. The extent of conversion depends on the temperature and time of thermal treatment, with total conversion within reasonable time periods requiring temperatures in the range of 1230 degree C. Even with the addition of seeds such as alpha-alumina or alpha-hematite, temperatures of at least 950 degrees C. are still required.

Solution synthesis techniques can produce fine, high purity, stoichiometric crystalline ceramic particles of single and multi-component metal oxides. Hydrothermal synthesis of alpha-alumina is known, but produces limited results. Synthesis typically requires high pressure in closed vessels, and synthesis to phase-pure materials is very slow. Because of the requirements for synthesis and the low yield amount, commercial exploitation of this process is relatively useless, and alternative synthesis techniques in nonaqueous solutions are being studied. Researchers M. Inoue et al. have shown that phase-pure, monodispersed hexagonal plates of alpha-alumina can be synthesized in certain glycols at a temperature of 300 degrees C., but control of size and morphology of the alpha-alumina was not achieved.

It is an object of this invention to provide a method for the nonaqueous synthesis of alpha-alumina particles in a glycol solution, where the resulting particle size and/or the particle morphology can be controlled by adjustment of particular parameters. It is a further object to provide such a method which enables the creation of alpha-alumina particles of particular size or the creation of alpha-alumina particles of particular shape. It is further object to provide such a method which produces alpha-alumina particles having morphologies heretofore unknown.

SUMMARY OF THE INVENTION

The method is a process for preparing phase-pure, monodispersed, single crystal alpha-alumina particles of particular size and shape by glycothermal treatment in 1,4-butanediol solution. Aluminum hydrous oxide is precipitated from an $Al(NO_3)_3.9H_2O$ solution by slowly adding KOH with rapid stirring to obtain the desired pH value of the solution in contact with the precipitated solid. The precipitated aluminum hydrous oxide is repeatedly washed in water and methanol and centrifuged, then redispersed in 1,4-butanediol and additional methanol if desired. Alternatively, high purity commercial gibbsite powder ($Al_2O_3.3H_2O$) with particle size below 0.2 microns can be used. The suspension is heated then placed in a pressure vessel, where the atmosphere is purged with nitrogen and the contents stirred and heated, typically to approximately 300 degrees C. Seed particles may be introduced into the solution. Pressure in the vessel is maintained between 4 MPa and 6 MPa. Reaction conditions such as reaction time, stirring speed, amount of methanol, and solid loading are controlled to produce desired size and morphology in the alpha-alumina particles. The vessel is cooled, the reaction products are repeatedly washed in isopropanol and centrifuged, then dried in a desiccator at 25 degrees C. for 48 hours. In particular, control of the morphology of the alpha-alumina particles is a function of stirring speed, while control of the size of the alpha-alumina particles is a function of seed concentration. Particular and distinct morphologies such as hexagonal platelets, hexagonal platelets with habits, hexagonal prisms, rhombic dodecahedrons, polyhedrons defined as minor dual faces on the short side walls of the platelets, and ruby-shapes are obtainable by control of the stirring rate. Several micron and sub-micron sizing of alpha-alumina particles over precise ranges with little size distribution is obtainable by varying the seed concentration.

BRIEF DESCRIPTION OF THE DRAWINGS

FIG. 11 is an SEM photomicrograph of the hexagonal platelet morphology.

FIG. 12 is an SEM photomicrograph of the hexagonal platelet with habit morphology.

FIG. 13 is an SEM photomicrograph of the hexagonal prism morphology.

FIG. 14 is an SEM photomicrograph of the rhombic dodecahedron morphology.

FIG. 15 is an SEM photomicrograph of the elongated rhombic dodecahedron morphology.

FIG. 16 is an SEM photomicrograph of the fourteen sided polyhedron with aspect ratio of approximately 1:1 morphology.

FIG. 17 is an SEM photomicrograph of the fourteen sided polyhedron elongated in the (0001) direction morphology.

FIG. 18 is an SEM photomicrograph of the ruby morphology.

DETAILED DESCRIPTION OF THE INVENTION

Figure 1:
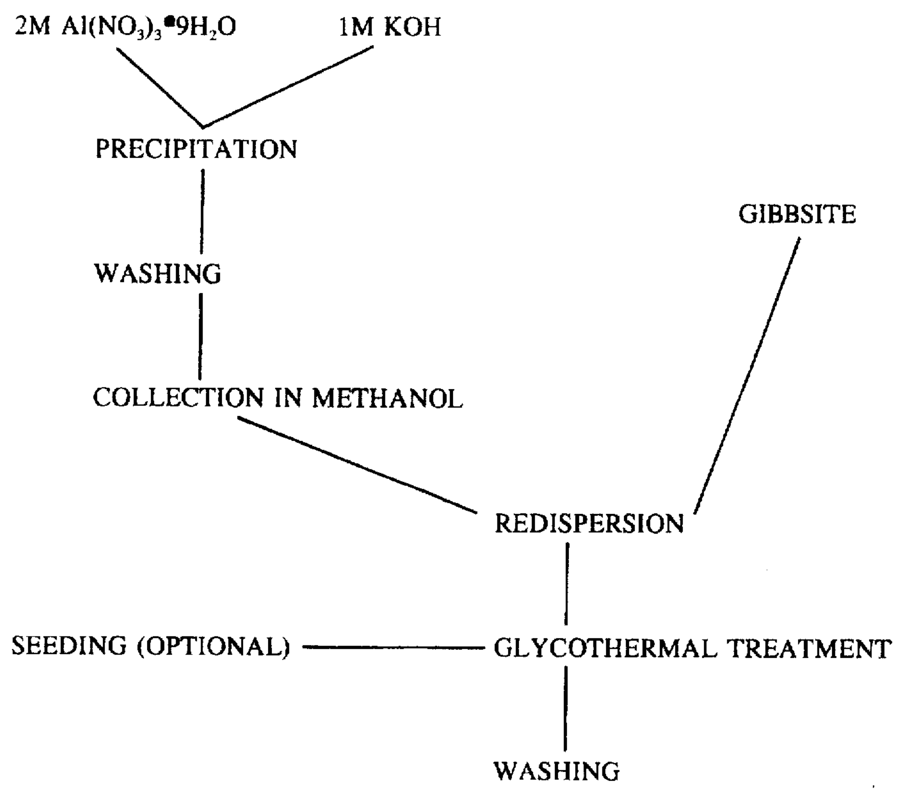
FIG. 1 is a schematic representation of the methodology steps in general.

In general, the invention is a method for the preparation, control of size and control of morphology, including the creation of unique morphologies, of alpha-alumina (alpha-$Al_2O_3$) particles in a glycol solution. The basic steps are outlined in FIG. 1, which shows various alternate processes for precipitating phase-pure, monodispersed, single crystal alpha-alumina particles. The method generally comprises the steps of providing a precursor for glycothermal treatment, either by a preliminary precipitation step or by supplying a source of non-alpha-alumina, such as gibbsite, and varying the stirring rate to control morphology, as well as optionally seeding the solution to promote nucleation, with further varying of the seed concentration to control size of the alpha-alumina particles synthesized during the glycothermal treatment step.

Preparation of an aluminum hydrous oxide by precipitation is accomplished by slowly adding 1M KOH solution to 2M $Al(NO_3)_3.9H_2O$ with rapid stirring to attain the desired pH value of the solution in contact with the precipitated solid, preferably in the range of 10 to 10.5 pH. Precipitation at more alkaline pH values of 11 or 12 did not promote the formation of pure alpha-alumina, resulting in mixtures of boehmite (gamma-AlOOH) and alpha-alumina or boehmite and gamma-alumina. The precipitated aluminum hydrous oxide is then washed by repeated cycles of centrifugation and redispersion in deionized water and then methanol, preferably at least five cycles. Excess solution is decanted and the wet aluminum hydrous is redispersed in 250 ml of 1,4-butanediol under vigorous stirring, with solid loading in the range of up to 20 g/250 ml. The suspension is heated to approximately 70 degrees C. and kept until all residual methanol is evaporated from the suspension. The suspension is then placed in a pressure vessel, for example a 1000 ml stainless steel vessel, equipped with a magnetic stirring head.

In the alternative, it has been found that provision of high-purity, ultrafine commercial gibbsite powder ($Al_2O_3.3H_2O$) with particle size less than approximately 0.2 microns can be substituted for the precipitation of the aluminum hydrous oxide without altering the synthesis process. For example, 10 grams of commercial gibbsite is dispersed in 100 ml methanol under rapid stirring and ultrasonicated for 2 hours to break up any agglomerates, then redispersed in 250 ml 1,4-butanediol solution and stirred for 2 hours. The suspension was then heated to 60 degrees C. for 12 hours under vigorous stirring to evaporate any residual methanol, and placed into a pressure vessel equipped with a magnetic stirring head.

The atmosphere in the sealed pressure vessel containing the suspension is then flushed with nitrogen to prevent oxidation and decomposition of the 1,4-butanediol when heated. The temperature of the suspension is then increased at a rate of approximately 3 degrees C. per minute to an elevated temperature of approximately 250 to 300 degrees C. During heating the autogenous vapor pressure in the vessel gradually increases to between 4 MPa and 6 MPa. The suspension is maintained at elevated temperature for extended time ranging from several hours to 24 hours, is stirred at rates up to 240 rpm, and is then cooled at approximately 2 degrees per minute to approximately 75 degrees C. and pressure released through a pressure relief valve. The reaction products are then washed at least five times by repeated cycles of centrifugation and redispersion in isopropanol, then the recovered alpha-alumina powder is dried at approximately 25 degrees C. in a desiccator for 48 hours.

In an alternative embodiment, the method further comprises a nucleation seeding step. Compatible seed particles such as alpha-alumina or alpha-hematite (alpha-$Fe_2O_3$) may be added to lower the heat of transformation and create multiplied nucleation of alpha-alumina, thus lowering the overall surface energy contribution to nucleation barrier, increasing nucleation frequency and reducing the size of the alpha-alumina platelets and other morphologies. The alpha-hematite seeds are sized at approximately 20 to 60 nanometers and the alpha-alumina seeds are sized at approximately 0.2 to 0.6 microns. The seed particles are added to the suspension of the precursor or gibbsite in 1,4-butanediol at various concentrations of from $10^4$ to $10^{10}$ seeds/ml prior to the heat treatment.

Figure 2:
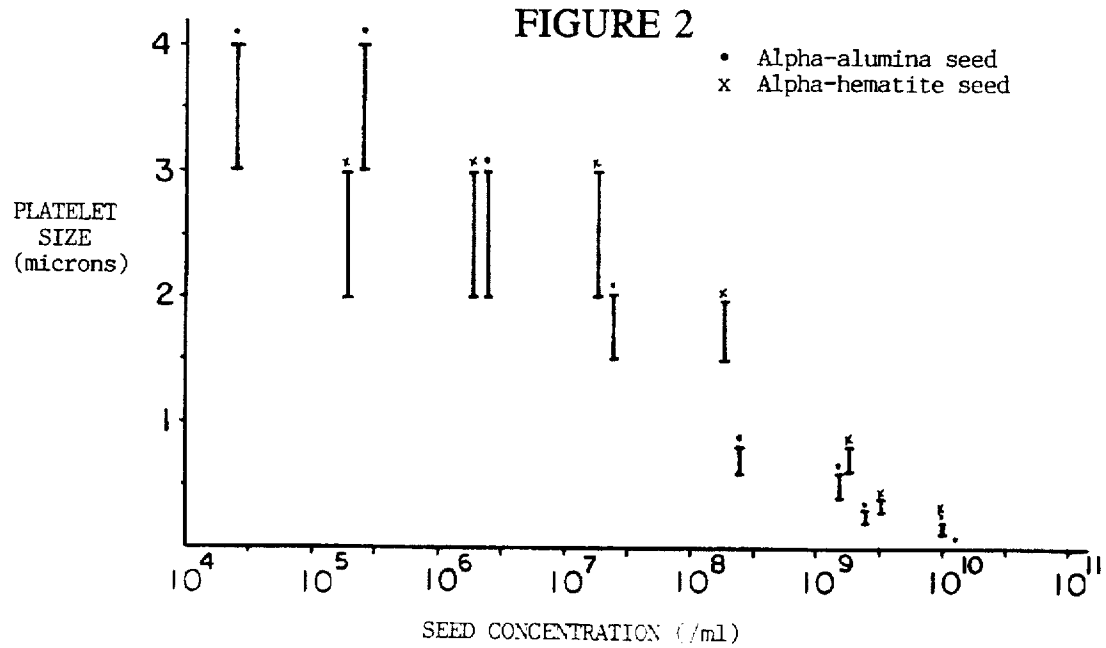
FIG. 2 is a graph relating the relationship of seed concentration to platelet size.

For the seeded methodology, the size of the alpha-alumina synthesized particles varies in direct relation to the concentration of the seeding solution, as shown in FIG. 2, which is a graphical depiction of the following experimental trials listed in Table 1 and Table 2. All examples were performed using the method steps set forth above, with reaction temperature of 300 degrees C., reaction time of 12 hours, peak pressure of 600 psig, stirring speed of 240 rpm, solid loading of 10 g/250 ml, with commercial gibbsite particles of less than 0.22 microns used as the feedstock and alpha-alumina or alpha-hematite as the nucleation seeds. The morphology of the synthesized alpha-alumina particles in all cases was the hexagonal platelet shape shown in FIGS. 3 and 11. A control trial was also run using the same processing parameters without addition of any seeds during the synthesis step.

TABLE 1

| TRIAL | ALPHA-ALUMINA SEED CONC. | PARTICLE SIZE |
|---|---|---|
| 0 | none | 3–4 microns |
| 1 | $4 \times 10^4$ seeds/ml | 3–4 |
| 2 | $4 \times 10^5$ | 3–4 |
| 3 | $4 \times 10^6$ | 2–3 |
| 4 | $4 \times 10^7$ | 1.5–2 |
| 5 | $4 \times 10^8$ | 0.6–0.8 |
| 6 | $2 \times 10^9$ | 0.4–0.6 |
| 7 | $4 \times 10^9$ | 0.2–0.3 |
| 8 | $1 \times 10^{10}$ | 0.1–0.2 |
| 9 | $2 \times 10^{10}$ | non-polygonal aggregate |
| 10 | $4 \times 10^{10}$ | non-polygonal aggregate |

TABLE 2

| TRIAL | ALPHA-HEMATITE SEED CONC. | PARTICLE SIZE |
|---|---|---|
| 11 | $2.5 \times 10^5$ seeds/ml | 2–3 microns |
| 12 | $2.5 \times 10^6$ | 2–3 |
| 13 | $2.5 \times 10^7$ | 2–3 |
| 14 | $2.5 \times 10^8$ | 1.5–2 |
| 15 | $2.5 \times 10^9$ | 0.6–0.8 |
| 16 | $5 \times 10^9$ | 0.3–0.4 |
| 17 | $1 \times 10^{10}$ | 0.1–0.2 |
| 18 | $2 \times 10^{10}$ | 0.1 |

Thus alpha-alumina particle size can be controlled by adjusting the seed concentration in process between a minimum and maximum value, with an increase in seed particle concentration resulting in a decrease in alpha-alumina particle size up to a critical maximum of approximately $2.5 \times 10^{10}$ seeds/ml, at which point formation of polygonal platelets is inhibited and only aggregate powder occurs from the glycothermal treatment. Seed concentrations below approximately $4\times10^4$ seeds/ml had no effect on platelet size when added to the gibbsite feedstock/1,4-butanediol suspension, producing alpha-alumina platelets of the same general size as when no seeds were added.

A different trial was run for the methodology utilizing the precipitated aluminum hydrous oxide formed with a precipitation pH of 10.5. In this comparative example the reaction temperature ranged from 275–300 degrees C., with reaction time of 12 hours, stirring speed of 36 rpm and solid loading of 5 g/250 ml. Alpha-hematite was used for the nucleation seeds at two different concentrations.

TABLE 3

| TRIAL | SEED CONCENTRATION | PARTICLE SIZE |
|---|---|---|
| 19 | $5 \times 10^9$ seeds/ml | 0.4–0.5 microns |
| 20 | $2 \times 10^{10}$ | 0.1–0.2 |

Figure 3:
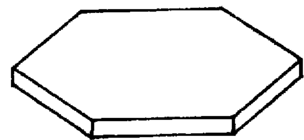
FIG. 3 is an illustration of the hexagonal platelet morphology.
Figure 9:
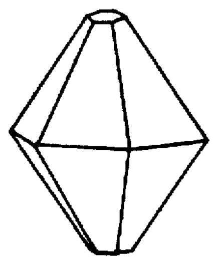
FIG. 9 is an illustration of the fourteen sided polyhedron elongated in the (0001) direction morphology.

In these trials the morphology of the resulting alpha-alumina particles was the elongated polyhedron shape with 14 faces, shown in FIGS. 9 and 17, rather than the hexagonal platelet shape of FIGS. 3 and 11, due to slower stirring (36 rpm vs. 240 rpm) during the synthesis process.

Figure 10:
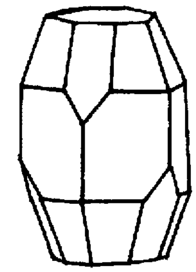
FIG. 10 is an illustration of the ruby morphology.

As alpha-alumina particle size is a direct function of seed concentration, the morphology of the alpha-alumina particles synthesized in the glycothermal process is a direct function of the stirring rate. The morphology resulting from the glycothermal processing can vary from the known hexagonal platelet shape of FIGS. 3 and 11 to the extremely extended ruby shape of FIGS. 10 and 18. Other than the hexagonal platelet and a poorly formed dodecahedron shape, the morphologies illustrated in the figures and produced by this process are heretofore unknown. Not only does the glycothermal treatment produce unique morphologies of alpha-alumina, the method provides control parameters to reproduce any of the desired morphologies, coupled with the ability to control at the same time the size of the resulting particles.

As shown in the Table 4 below, a comparative trial was run using the precipitated aluminum hydrous oxide at a reaction temperature of 300 degrees C., a reaction time of 24 hours, no seeding and variable stirring rates. The resulting morphologies are listed with reference to the illustrations. As stirring rate decreases, the alpha-alumina morphology changes from the generally anisotropic hexagonal platelet to more extended or more faceted three-dimensional polygonal shapes. Estimated shear rates in Table 4 are calculated to be $12\ s^{-1}$ for 240 rpm, $5\ s^{-1}$ for 130 rpm and $0.7\ s^{-1}$ for 36 rpm.

TABLE 4

Figure 4:
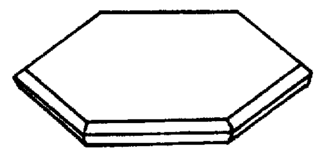
FIG. 4 is an illustration of the hexagonal platelet with habit morphology.
Figure 5:
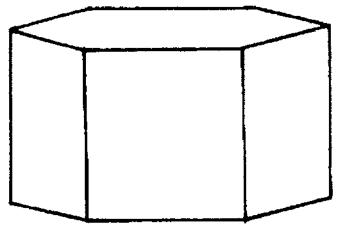
FIG. 5 is an illustration of the hexagonal prism morphology.
Figure 8:
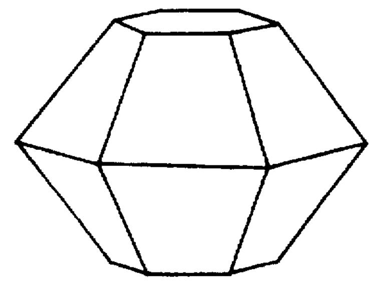
FIG. 8 is an illustration of the fourteen sided regular polyhedron with aspect ratio of approximately 1:1 morphology.

| TRIAL | STIRRING RATE | MORPHOLOGY |
|---|---|---|
| 21 | 240 rpm | hexagonal platelet (FIG. 3, 11) |
| 22 | 130 | hexagonal platelet with habit (FIG. 4, 12) |
| 23 | 130 | hexagonal prism (FIG. 5, 13) |
| 24 | 36 | fourteen sided regular polyhedron with aspect ratio of approximately 1:1 (FIG. 8, 16) |

A second comparative trial was undertaken with shorter reaction time (12 hours) at a reaction temperature of 300 degrees C. In trials 26, 27, and 28 additional methanol was added during the glycothermal step. In trials 27 and 28, nucleation seeds were added. The results of this test are shown in Table 5 below, which again demonstrate the effect of varying stirring rate shear rate) on the resultant morphologies, with a high stirring rate providing the basic shape and decreasing stirring rates providing increasingly fuller and more faceted three-dimensional polygonal shapes.

TABLE 5

Figure 6:
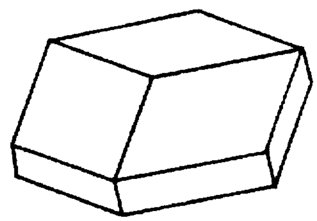
FIG. 6 is an illustration of the rhombic dodecahedron morphology.
Figure 7:
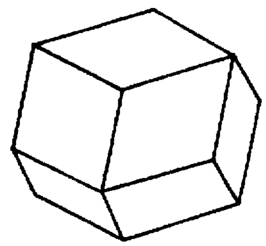
FIG. 7 is an illustration of the elongated rhombic dodecahedron morphology.

| TRIAL | STIRRING RATE | MORPHOLOGY |
|---|---|---|
| 25 | 240 rpm | hexagonal platelet (FIG. 3, 11) |
| 26 | 130 | rhombic dodecahedron (FIG. 6, 14) |
| 27 | 130 | elongated rhombic dodecahedron (FIG. 7, 15) |
| 28 | 36 | fourteen sided polyhedron elongated in the (0001) direction (FIG. 9, 17) |
| 29 | 0 | ruby (FIG. 10, 18) |

It is postulated that with low stirring rates, growth of the alpha-alumina particles is controlled by diffusion principles, while with higher stirring rates, diffusion factors are minimized and growth is controlled by shear effects.

It is contemplated that equivalents and substitutions may be obvious to those skilled in the art, and the above examples are by way of illustration only. The true scope and definition of the invention therefore is to be as set forth in the following claims.

We claim:

1. A phase-pure, monodispersed, single crystal alpha-alumina particle of controlled size and morphology produced by the method comprising the steps of:

choosing a particular size and morphology of phase-pure, monodispersed, single crystal alpha-alumina particles, providing an aluminum hydrous oxide and 1,4-butanediol, dispersing said aluminum hydrous oxide in said 1,4-butanediol to create a suspension at a solid loading rate of from 5 to 20 g/250 ml dependent on said chosen size and morphology, heating said suspension to between approximately 250 to 300 degrees C. and stirring said suspension to produce a shear rate of from $0\ s^{-1}$ to $12\ s^{-1}$ dependent on said chosen size and morphology in a closed pressure vessel to produce alpha-alumina particles of said chosen size and morphology, cooling said suspension, and removing said alpha-alumina particles from said suspension, wherein said particular size and morphology of phase-pure, monodispersed, single crystal alpha-alumina particles is selected from the group of sizes and morphologies consisting of (a) approximately 2 to 3 micron hexagonal platelet, and said solid loading rate is approximately 5 g/250 ml, and said shear rate is approximately $12\ s^{-1}$, where said heating and stirring is performed from 12 to 24 hours:

(b) approximately 6 to 7 micron hexagonal platelet, and said solid loading rate is approximately 10 g/250 ml, and said shear rate is approximately $12\ s^{-1}$ , where said heating and stirring is performed from 12 to 24 hours;

(c) approximately 2 to 3 micron hexagonal platelet with dual minor faces on the short side walls, and said solid loading rate is approximately 5 g/250 ml, and said shear rate is approximately $5\ s^{-1}$, where said heating and stirring is performed for approximately 24 hours;

(d) approximately 3 to 4 micron hexagonal prism, and said solid loading rate is approximately 10 g/250 ml, and said shear rate is approximately 5 $s^{-1}$, where said heating and stirring is performed for approximately 24 hours;

(e) approximately 2 to 3 micron rhombic dodecahedron, and said solid loading rate is approximately 5 g/250 ml, and said shear rate is approximately 5 $s^{-1}$, where said heating and stirring were performed for approximately 12 hours and further comprising the step of adding methanol into said suspension;

(f) approximately 2 to 3 micron elongated rhombic dodecahedron, and said solid loading rate is approximately 5 g/250 ml, and said shear rate is approximately 5 $s^{-1}$, where said heating and stirring were performed for approximately 12 hours and further comprising the step of adding methanol and nucleation seeds from the group consisting of alpha-alumina and alpha-hematite into said suspension at a concentration between approximately $2.5\times10^{10}$ and $4\times10^{4}$ seeds/ml;

(g) approximately 3 to 4 micron fourteen sided regular polyhedron with aspect ratio of approximately 1:1, and said solid loading rate is approximately 10 g/250 ml, and said shear rate is approximately 0.7 $s^{-1}$, where said heating and stirring is performed for approximately 24 hours;

(h) approximately 3 to 4 micron fourteen sided polyhedron elongated in the (0001) direction, and said solid loading rate is approximately 5 g/250 ml, and said shear rate is approximately 0.7 $s^{-1}$, where said heating and stirring is performed for approximately 12 hours, and further comprising the step of adding nucleation seeds from the group consisting of alpha-alumina and alpha-hematite into said suspension at a concentration between approximately $2.5\times10^{10}$ and $4\times10^{4}$ seeds/ml; and (i) approximately 3 to 4 micron ruby, and said solid loading rate is approximately 5 g/250 ml, and said shear rate is zero $s^{-1}$, where said heating and stirring is performed for approximately 12 hours, and further comprising the step of adding methanol into said suspension.

2. A method for producing phase-pure, monodispersed, single crystal alpha-alumina particles of controlled size and morphology of approximately 2 to 3 micron hexagonal platelet comprising the steps of: providing an aluminum hydrous oxide and 1,4-butanediol, dispersing said aluminum hydrous oxide in said 1,4-butanediol to create a suspension at a solid loading rate of approximately 5 g/250 ml, heating said suspension to between approximately 250 to 300 degrees C. and stirring said suspension to produce a shear rate of approximately 12 $s^{-1}$ in a closed pressure vessel for approximately 12 to 24 hours to produce a number of said alpha-alumina particles, cooling said suspension, and removing said alpha-alumina particles from said suspension.

3. A method for producing phase-pure, monodispersed, single crystal alpha-alumina particles of controlled size and morphology of approximately 6 to 7 micron hexagonal platelet comprising the steps of:

providing an aluminum hydrous oxide and 1,4-butanediol, dispersing said aluminum hydrous oxide in said 1,4-butanediol to create a suspension at a solid loading rate of approximately 10 g/250 ml, heating said suspension to between approximately 250 to 300 degrees C. and stirring said suspension to produce a shear rate of approximately 12 $s^{-1}$ in a closed pressure vessel for approximately 12 to 24 hours to produce a number of said alpha-alumina particles, cooling said suspension, and removing said alpha-alumina particles from said suspension.

4. A method for producing phase-pure, monodispersed, single crystal alpha-alumina particles of controlled size and morphology of approximately 2 to 3 micron hexagonal platelet having minor dual faces on the short side walls comprising the steps of:

providing an aluminum hydrous oxide and 1,4-butanediol, dispersing said aluminum hydrous oxide in said 1,4-butanediol to create a suspension at a solid loading rate of approximately 5 g/250 ml, heating said suspension to between approximately 250 to 300 degrees C. and stirring said suspension to produce a shear rate of approximately 5 $s^{-1}$ in a closed pressure vessel for approximately 24 hours to produce a number of said alpha-alumina particles, cooling said suspension, and removing said alpha-alumina particles from said suspension.

5. A method for producing phase-pure, monodispersed, single crystal alpha-alumina particles of controlled size and morphology of approximately 3 to 4 micron hexagonal prism comprising the steps of:

providing an aluminum hydrous oxide and 1,4-butanediol, dispersing said aluminum hydrous oxide in said 1,4-butanediol to create a suspension at a solid loading rate of approximately 10 g/250 ml, heating said suspension to between approximately 250 to 300 degrees C. and stirring said suspension to produce a shear rate of approximately 5 $s^{-1}$ in a closed pressure vessel for approximately 24 hours to produce a number of said alpha-alumina particles, cooling said suspension, and removing said alpha-alumina particles from said suspension.

6. A method for producing phase-pure, monodispersed, single crystal alpha-alumina particles of controlled size and morphology of approximately 2 to 3 micron rhombic dodecahedron comprising the steps of:

providing an aluminum hydrous oxide and 1,4-butanediol, dispersing said aluminum hydrous oxide in said 1,4-butanediol to create a suspension at a solid loading rate of approximately 5 g/250 ml, adding methanol into said suspension, heating said suspension to between approximately 250 to 300 degrees C. and stirring said suspension to produce a shear rate of approximately 5 $s^{-1}$ in a closed pressure vessel for approximately 12 hours to produce a number of said alpha-alumina particles, cooling said suspension, and removing said alpha-alumina particles from said suspension.

7. A method for producing phase-pure, monodispersed, single crystal alpha-alumina particles of controlled size and morphology of approximately 2 to 3 micron elongated rhombic dodecahedron comprising the steps of:

providing an aluminum hydrous oxide and 1,4-butanediol, dispersing said aluminum hydrous oxide in said 1,4-butanediol to create a suspension at a solid loading rate of approximately 5 g/250 ml, adding methanol and nucleation seeds from the group consisting of alpha-alumina and alpha-hematite at a concentration between approximately $2.5\times10^{10}$ and $4\times10^{4}$ seeds/ml into said suspension, heating said suspension to between approximately 250 to 300 degrees C. and stirring said suspension to produce a shear rate of approximately 5 $s^{-1}$ in a closed pressure vessel for approximately 12 hours to produce a number of said alpha-alumina particles, cooling said suspension, and removing said alpha-alumina particles from said suspension.

8. A method for producing phase-pure, monodispersed, single crystal alpha-alumina particles of controlled size and morphology of approximately 3 to 4 micron fourteen sided regular polyhedron with aspect ratio of approximately 1:1 comprising the steps of:

providing an aluminum hydrous oxide and 1,4-butanediol, dispersing said aluminum hydrous oxide in said 1,4-butanediol to create a suspension at a solid loading rate of approximately 10 g/250 ml, heating said suspension to between approximately 250 to 300 degrees C. and stirring said suspension to produce a shear rate of approximately 0.7 $s^{-1}$ in a closed pressure vessel for approximately 24 hours to produce a number of said alpha-alumina particles, cooling said suspension, and removing said alpha-alumina particles from said suspension.

9. A method for producing phase-pure, monodispersed, single crystal alpha-alumina particles of controlled size and morphology of approximately 3 to 4 micron fourteen sided polyhedron elongated in the (0001) direction comprising the steps of:

providing an aluminum hydrous oxide and 1,4-butanediol, dispersing said aluminum hydrous oxide in said 1,4-butanediol to create a suspension at a solid loading rate of approximately 5 g/250 ml, adding nucleation seeds from the group consisting of alpha-alumina and alpha-hematite at a concentration between approximately $2.5\times10^{10}$ and $4\times10^{4}$ seeds/ml into said suspension, heating said suspension to between approximately 250 to 300 degrees C. and stirring said suspension to produce a shear rate of approximately 0.7 $s^{-1}$ in a closed pressure vessel for approximately 12 hours to produce a number of said alpha-alumina particles, cooling said suspension, and removing said alpha-alumina particles from said suspension.

10. A method for producing phase-pure, monodispersed, single crystal alpha-alumina particles of controlled size and morphology of approximately 3 to 4 micron ruby comprising the steps of:

providing an aluminum hydrous oxide and 1,4-butanediol, dispersing said aluminum hydrous oxide in said 1,4-butanediol to create a suspension at a solid loading rate of approximately 5 g/250 ml, adding methanol into said suspension, heating said suspension to between approximately 250 to 300 degrees C. and stirring said suspension to produce a shear rate of approximately 0 $s^{-1}$ in a closed pressure vessel for approximately 12 hours to produce a number of said alpha-alumina particles, cooling said suspension, and removing said alpha-alumina particles from said suspension.

* * * * *